Figure 1:
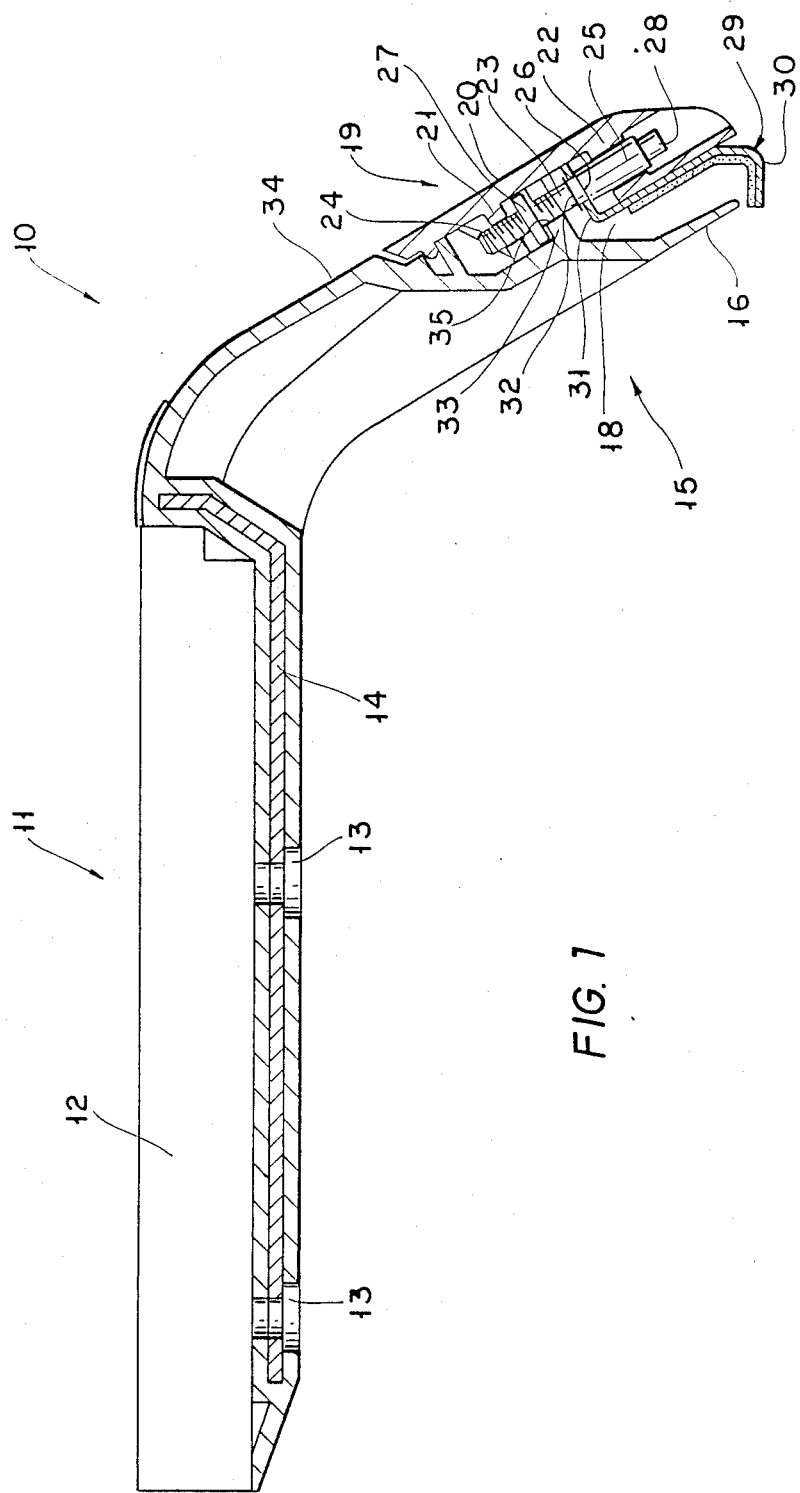

United States Patent [19]

Marshall

[11] Patent Number: 4,984,726
[45] Date of Patent: Jan. 15, 1991

[54] VEHICLE ROOF RACK

[75] Inventor: Bryan H. Marshall, Glebe, Australia

[73] Assignee: Unistrut Australia Pty Limited, Mt. Druitt, Australia

[21] Appl. No.: 468,581

[22] Filed: Jan. 23, 1990

[30] Foreign Application Priority Data

Jan. 23, 1989 [AU] Australia ................ PJ2370

[51] Int. Cl.⁵ ............................... B60R 9/00
[52] U.S. Cl. ........................ 224/331; 224/329
[58] Field of Search .............. 224/331, 330, 329

[56] References Cited

U.S. PATENT DOCUMENTS 2,919,841  1/1960  Helm .................... 224/329
3,525,461  8/1970  Bronson ................ 224/331
3,628,844  2/1972  Bronson .
3,917,136 11/1975  Carson .

FOREIGN PATENT DOCUMENTS 0105849  4/1984  European Pat. Off. .
1358222  7/1974  United Kingdom .
8100087  6/1980  World Int. Prop. O. .

Primary Examiner—Linda J. Sholl
Attorney, Agent, or Firm—Ladas & Parry

[57] ABSTRACT

A vehicle roof rack mounting including a body having a cavity to receive a clamp assembly. The clamp assembly includes a cap to close the cavity and a clamp bracket moved into clamping engagement with a vehicle gutter by means of a threaded rod rotatably mounted in the cap and engaging the bracket to cause movement of the bracket.

5 Claims, 2 Drawing Sheets

VEHICLE ROOF RACK

The present invention relates to motor vehicle roof racks, and more particularly but not exclusively to roof racks for vehicles which have a gutter.

Roof racks are generally vulnerable in respect of theft since they are easily removed from the vehicle roof. A further disadvantage of commonly available roof racks is the cost of manufacture and the lack of asthetic appeal.

It is the object of the present invention to overcome or substantially ameliorate the above disadvantages.

There is disclosed herein a vehicle roof rack mounting to receive an end of a roof rack bar which extends across a vehicle upon which the mounting is to be received, said mounting comprising:

a body which in use is generally upwardly extending from a vehicle gutter engaging portion to a bar engaging portion, said body having a flange spaced from said gutter engaging portion towards said bar engaging portion and having a face projecting away from said gutter engaging portion, said flange also having an aperture; and a clamp assembly including a cap, a threaded rod rotatably supported in said cap and passing through the aperture in said flange, a nut threadably mounted on said rod and abutting said face, a clamp bracket having a lip to engage a gutter portion of the vehicle, and an opening through which said rod passes so that said rod is rotatable about its longitudinal axis relative to said bracket, and wherein said rod has an abutment surface facing said nut and which engages said bracket so that upon rotation of said rod in a predetermined rotational direction said bracket is caused to move towards said nut to move said bracket into a clamping position with respect to the vehicle gutter.

Figure 2:
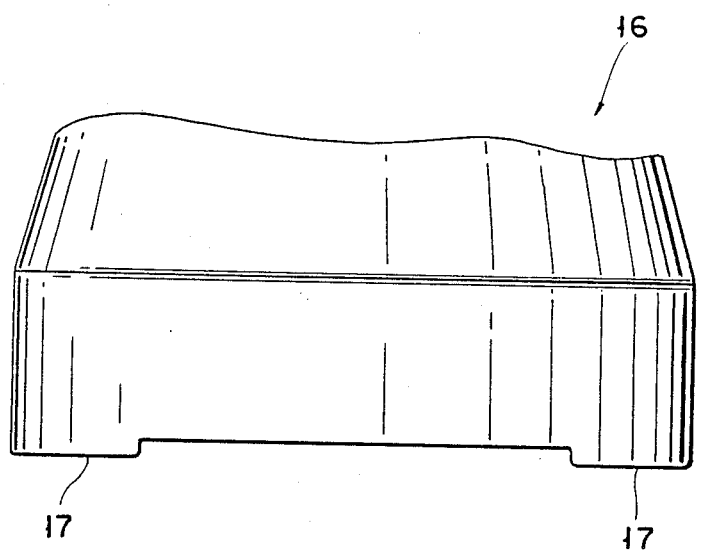

A preferred form of the present invention will now be described by way of example with reference to the accompanying drawings, wherein:

FIG. 1 is a schematic sectioned side elevation of a mounting bracket for a motor vehicle roof rack; and FIG. 2 is a schematic end elevation of a gutter engaging portion of the mounting of FIG. 1.

In the accompanying drawings there is schematically depicted a vehicle roof rack mounting 10 to receive a roof rack bar to extend across a vehicle, to a similar mounting on the other side of the vehicle. The mounting 10 has an end portion 11 to be attached to the roof rack bar. The portion 11 has a recess 12 within which the bar is located, and is further provided with apertures 13 through which threaded fasteners, other types of fasteners, may pass to secure the bar to the mounting 10. Preferably the end portion 11 is formed of plastics material within which there is embedded a reinforcing metal member 14.

The mounting 10 has a gutter engaging portion 15 including a gutter blade 16 which fits down into the gutter of the vehicle. The blade 16 has two projections 17 which axially engage within the gutter trough to support the bracket 10 thereon.

The mounting 10 defines a cavity 18 within which a clamp assembly 19 is located. The clamp assembly 19 includes a cap 20 which effectively covers the recess 18. The cap 20 has a pair of flanges 21 and 22 which rotatably support a rod 23. The rod 23 has a threaded portion 24 and an enlarged bearing portion 25. The bearing portion 25 providing an abutment face 26. The threaded portion 24 threadably receives a nut 27. The rod terminates at one end with a head 28 having a configuration adapted to be engaged by a special socket which is rotated by the user to cause rotation of the rod 23.

The clamp assembly 19 further includes a gutter clamp bracket 29 having a clamp flange 30 which engages beneath the gutter. The bracket 29 is also provided with a flange 31 with an aperture or opening 35 through which the rod 23 passes. A circuit 32 retains the clamp bracket 29 in a position adjacent the face 26 so that the face 26 is in abutment with the flange 31.

The gutter engaging portion 15 is further provided with a flange 33 with a slot through which the rod 23 passes. The flange 33 provides a face which abuts the nut 27.

In operation of the above described mounting 10, a user, by means of a special tool or key engages the head 28 to cause rotation of the rod 23. Rotation of the rod 23 in a predetermined direction will cause the rod 23 to advance along its longitudinal axis and take with it the clamp bracket 29 toward the flange 33. Advancement of the rod 23 is caused by the threaded engagement with the nut 27. Reverse rotation of the rod 23 will release the clamp bracket 29 from engagement with the roof gutter.

It should be appreciated that the clamp assembly 19 is removably from the body 34, of the bracket 10, as a complete assembly by having the rod 23 movable from within the recess or aperture formed in the flange 33.

What we claim is:

1. A vehicle roof rack mounting to receive an end of a roof rack bar which extends across a vehicle upon which the mounting is to be received, said mounting comprising:

a body which in use is generally upwardly extending from a vehicle gutter engaging portion to a bar engaging portion, said body having a flange spaced from said gutter engaging portion towards said bar engaging portion and having a face projecting away from said gutter engaging portion, said flange also having an aperture; and a clamp assembly including a cap, a threaded rod rotatably supported in said cap and passing through the aperture in said flange, a nut threadably mounted on said rod and abutting said face, a clamp bracket having a lip to engage a gutter portion of the vehicle, and an opening through which said rod passes so that said rod is rotatable about its longitudinal axis relative to said bracket, and wherein said rod has an abutment surface facing said nut and which engages said bracket so that upon rotation of said rod in a predetermined rotational direction said bracket is caused to move towards said nut to move said bracket into a clamping position with respect to the vehicle gutter.

2. The vehicle roof rack mounting of claim 1, wherein said body has a cavity which receives said clamp assembly, and said cap substantially closes said cavity.

3. The vehicle roof rack mounting of claim 2, wherein said bar engaging portion is generally horizontally extending.

4. The vehicle roof rack mounting of claim 1, wherein said body is formed of plastics material and said bar engaging portion is reinforced by a metal insert.

5. The vehicle roof rack mounting of claim 4, wherein an extremity of said threaded rod is exposed for engagement with a tool to be manipulated by a user to cause rotation of the rod.

* * * * *